US009928754B2

(12) United States Patent
Yoon et al.

(10) Patent No.: US 9,928,754 B2

(45) Date of Patent: Mar. 27, 2018

(54) SYSTEMS AND METHODS FOR GENERATING RECITATION ITEMS

(71) Applicant: Educational Testing Service, Princeton, NJ (US)

(72) Inventors: Su-Youn Yoon, West Windsor, NJ (US); Lei Chen, Pennignton, NJ (US); Keelan Evanini, Pennington, NJ (US); Klaus Zechner, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 811 days.

(21) Appl. No.: 14/215,124

(22) Filed: Mar. 17, 2014

(65) Prior Publication Data

US 2014/0278376 A1 Sep. 18, 2014

Related U.S. Application Data

(60) Provisional application No. 61/802,904, filed on Mar. 18, 2013.

(51) Int. Cl.

| | |
|---|---|
| ***G09B 17/00*** | (2006.01) |
| ***G09B 19/04*** | (2006.01) |
| *G06F 17/27* | (2006.01) |
| *G10L 13/08* | (2013.01) |

(52) U.S. Cl.

CPC ............ *G09B 19/04* (2013.01); *G06F 17/271* (2013.01); *G10L 13/08* (2013.01)

(58) Field of Classification Search

CPC ... G06F 17/271; G09B 19/04; G10L 15/1807; G10L 13/10; G10L 13/08; G10L 17/14

See application file for complete search history.

(56) References Cited

U.S. PATENT DOCUMENTS 7,373,102 B2 * 5/2008 Deane .................. G06F 17/277 434/353

7,392,187 B2 * 6/2008 Bejar .................... G10L 15/063 704/243

7,739,103 B2 * 6/2010 Deane ................. G06F 17/2775 704/1

(Continued)

OTHER PUBLICATIONS

Cui, Xiaodong, Alwan, Abeer; Efficient Adaptation Text Design Based on the Kullback-Leibler Measure; Proceedings of the IEEE International Conference on Acoustic Speech and Signal Processing, 1; pp. 613-616; 2002.

(Continued)

*Primary Examiner* — Nathan Hillery

(74) *Attorney, Agent, or Firm* — Jones Day

(57) ABSTRACT

Computer-implemented systems and methods are provided for automatically generating recitation items. For example, a computer performing the recitation item generation can receive one or more text sets that each includes one or more texts. The computer can determine a value for each text set using one or more metrics, such as a vocabulary difficulty metric, a syntactic complexity metric, a phoneme distribution metric, a phonetic difficulty metric, and a prosody distribution metric. Then the computer can select a final text set based on the value associated with each text set. The selected final text set can be used as the recitation items for a speaking assessment test.

21 Claims, 10 Drawing Sheets

(56) References Cited

U.S. PATENT DOCUMENTS

| | | | | |
|---|---|---|---|---|
| 7,840,404 | B2 * | 11/2010 | Xi | G10L 15/26 704/243 |
| 8,147,250 | B2 * | 4/2012 | Deane | G06F 17/277 434/169 |
| 8,209,173 | B2 * | 6/2012 | Bejar | G10L 15/063 704/243 |
| 8,275,306 | B2 * | 9/2012 | Attali | G09B 7/02 434/322 |
| 2002/0099554 | A1 * | 7/2002 | Spiser-Albert | G09B 5/06 704/271 |
| 2002/0116183 | A1 * | 8/2002 | Waryas | G09B 5/06 704/209 |
| 2002/0120441 | A1 * | 8/2002 | Waryas | G09B 5/06 704/220 |
| 2002/0147587 | A1 * | 10/2002 | Townshend | G10L 15/26 704/235 |
| 2003/0163316 | A1 * | 8/2003 | Addison | G09B 5/04 704/260 |
| 2003/0229497 | A1 * | 12/2003 | Wilson | G09B 5/04 704/270.1 |
| 2004/0078204 | A1 * | 4/2004 | Segond | G09B 5/06 704/277 |
| 2005/0095564 | A1 * | 5/2005 | Stuart | G09B 19/04 434/112 |
| 2006/0122826 | A1 * | 6/2006 | Jiang | A61F 5/58 704/205 |
| 2006/0155538 | A1 * | 7/2006 | Higgins | G09B 19/06 704/246 |
| 2006/0172276 | A1 * | 8/2006 | Higgins | G09B 7/00 434/362 |
| 2006/0177799 | A9 * | 8/2006 | Stuart | G09B 19/04 434/112 |
| 2008/0221893 | A1 * | 9/2008 | Kaiser | G10L 15/24 704/257 |
| 2008/0294440 | A1 * | 11/2008 | Higgins | G09B 19/06 704/251 |
| 2010/0036654 | A1 * | 2/2010 | Futagi | G06F 17/277 704/9 |
| 2010/0145698 | A1 * | 6/2010 | Chen | G09B 7/02 704/256.1 |
| 2010/0250238 | A1 * | 9/2010 | Deane | G06F 17/2775 704/9 |
| 2011/0040554 | A1 * | 2/2011 | Audhkhasi | G09B 19/04 704/9 |
| 2013/0189652 | A1 * | 7/2013 | Marttila | G09B 19/04 434/156 |

OTHER PUBLICATIONS

Rosenberg, Andrew; AuToBI—A Tool for Automatic ToBI Annotation; Interspeech; pp. 146-149; 2010.

Silverman, Kim, Beckman, Mary, Pitrelli, John, Ostendorf, Mari, Wightman, Colin, Price, Patti, Pierrehumbert, Janet, Hirschberg, Julia; ToBI: A Standard for Labeling English Prosody; Proceedings of the International Conference on Spoken Language Processing, 2; pp. 867-870; 1992.

Wu, Chung-Hsien, Su, Hung-Yu, Liu, Chao-Hong; Efficient Personalized Mispronunciation Detection of Taiwanese-Accented English Speech Based on Unsupervised Model Adaptation and Dynamic Sentence Selection; Computer Assisted Language Learning, 26(5); pp. 446-467; 2013.

Zechner, Klaus, Higgins, Derrick, Lawless, Rene, Futagi, Yoko, Ohls, Sarah, Ivanov, George; Adapting the Acoustic Model of a Speech Recognizer for Varied Proficiency Non-Native Spontaneous Speech Using Read Speech with Language-Specific Pronunciation Difficulty; Interspeech; pp. 612-615; 2009.

* cited by examiner

SYSTEMS AND METHODS FOR GENERATING RECITATION ITEMS

Applicant claims benefit pursuant to 35 U.S.C. § 119 and hereby incorporates by reference the following U.S. Provisional Patent Application in its entirety: "An Automated Recitation Item Generation Method," App. No. 61/802,904, filed Mar. 18, 2013.

FIELD

The technology described herein relates generally to text selection and more specifically to automatic generation of recitation items for speaking assessment.

BACKGROUND

Assessment of a person's speaking proficiency is often performed in education and in other domains. Such speaking assessment typically takes the form of texts (e.g., essays, passages, articles, etc.) being presented to and read by the person being assessed. The texts used in the assessments are usually selected from a large pool of texts collected from diverse resources (e.g., textbooks, journals, websites, and manual generation). The selection process, however, is often performed manually, which is costly, time-consuming, and lacks objectivity.

SUMMARY

In accordance with the teachings herein, computer-implemented systems and methods are provided for automatically generating recitation items. For example, a computer performing the recitation item generation can receive one or more text sets that each includes one or more texts. The computer can determine a value for each text set using one or more metrics, such as a vocabulary difficulty metric, a syntactic complexity metric, a phoneme distribution metric, a phonetic difficulty metric, and a prosody distribution metric. Then the computer can select a final text set based on the value associated with each text set. The selected final text set can be used as the recitation items for a speaking assessment test.

DETAILED DESCRIPTION

Figure 1:
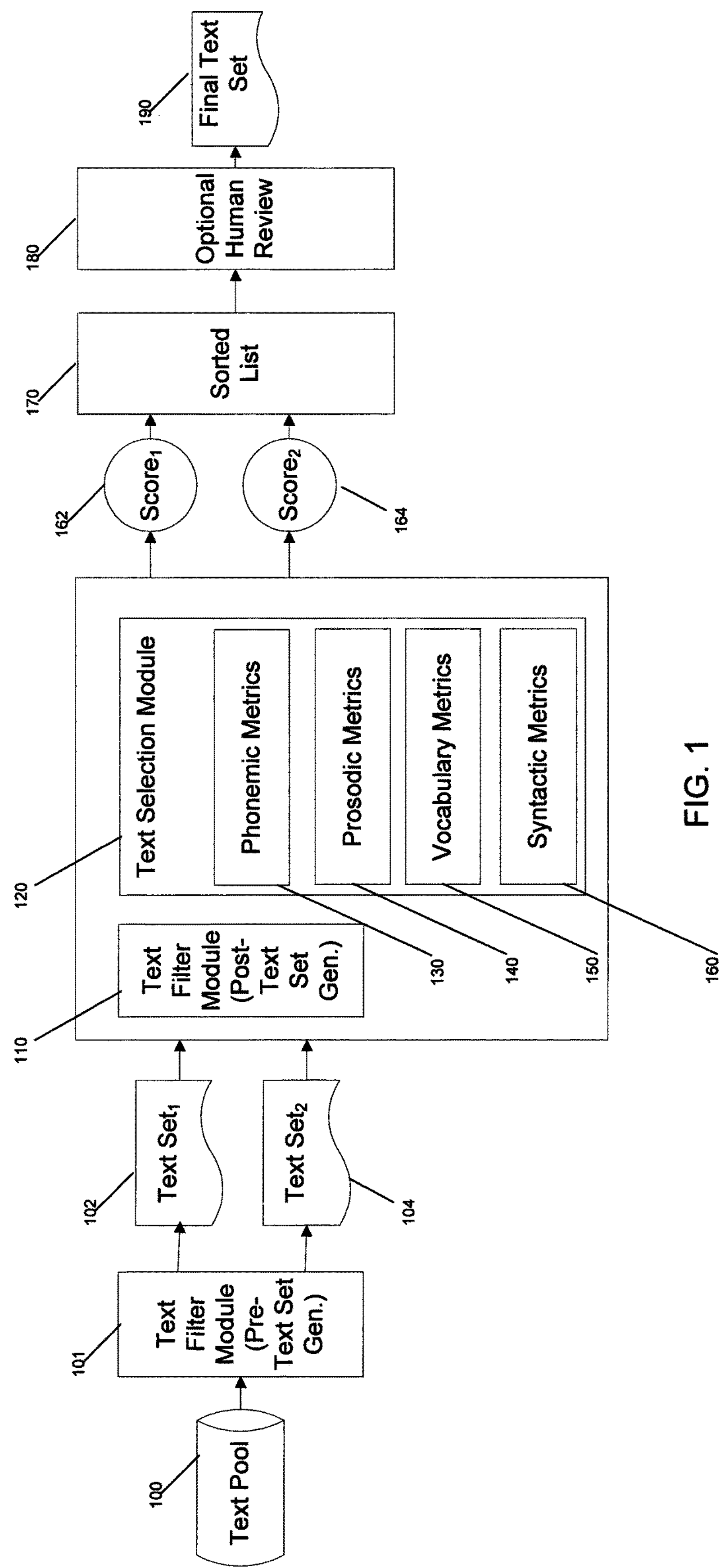
FIG. 1 depicts a computer-implemented environment for generating recitation items.

FIG. 1 is a high-level diagram depicting one embodiment of a computer-implemented environment for automatically generating recitation items (i.e., text sets to be used for speaking assessments). Text pool 100 is a collection of texts from which candidate recitation items (which may be referred to as text sets) are selected. In one embodiment, before text sets are generated, the texts from the text pool 100 may be optionally filtered by a pre-set-generation text filter module 101, which stores one or more rules for identifying problematic words, phrases, and/or sentences in a text that make the text undesirable or unsuitable as a recitation item. A text that is deemed undesirable is ineligible to be included in a text set.

The unfiltered or pre-filtered texts are then used to form one or more text sets. Candidate text sets, such as Text $Set_1$ 102 and Text $Set_2$ 104, are each a subset of the text pool 100. In one embodiment, the candidate text sets, each of a given size M, are generated by creating all possible combinations of M candidate texts. In another embodiment, a text set is generated by selecting one text at a time using Kullback-Leibler divergence measure or other entropy optimization methods.

Once the text sets have been generated, each candidate text set is processed according to an optional post-set-generation text filter module 110 and a text selection module 120. Similar to the pre-set-generation text filter module 101, the post-set-generation text filter module 110 stores one or more rules for identifying problematic words, phrases, and/or sentences in a text that make the text undesirable or unsuitable as a recitation item. However, instead of filtering texts from the text pool 100 before the text sets are generated, the post-set-generation text filter module 110 filters text sets after they have been generated. If a text set includes a text that is deemed undesirable by the post-set-generation text filter module 110, the text set may be filtered out is no longer a candidate for the recitation items.

With respect to the text selection module 120, it applies one or more metrics to a text set and accordingly determines a score that reflects the text set's overall suitability to be used as recitation items for a particular assessment test. The text selection module 120 may utilize (1) phonemic metrics 130 to quantify the phonemic characteristics of a text set; (2) prosodic metrics 140 to quantify the prosodic characteristics of a text set; (3) vocabulary metrics 150 to quantify the difficulty of vocabulary in a text set; and/or (4) syntactic metrics 160 to quantify the syntactical complexity of a text set. While the order in which the modules and metrics are applied is not deterministic (i.e., they can be applied in any order), in one embodiment application of the text filter module 110 is followed by application of the text selection module 120.

Based on the results of the applied metrics, the text selection module 120 determines a score for each processed text set. In FIG. 1, $Score_1$ 162 represents the score of Text $Set_1$ 102, and similarity $Score_2$ 164 represents the score of Text $Set_2$ 104. The scores are then compared or arranged such that the best score can be identified. In one embodiment, the scores are placed in a sorted list 170. Once the relative suitability of the text sets can be readily identified, the text sets can optionally be reviewed by humans 180. The final text set 190, which can be used as the recitation items, can be chosen based on the sorted list 170.

Figure 2:
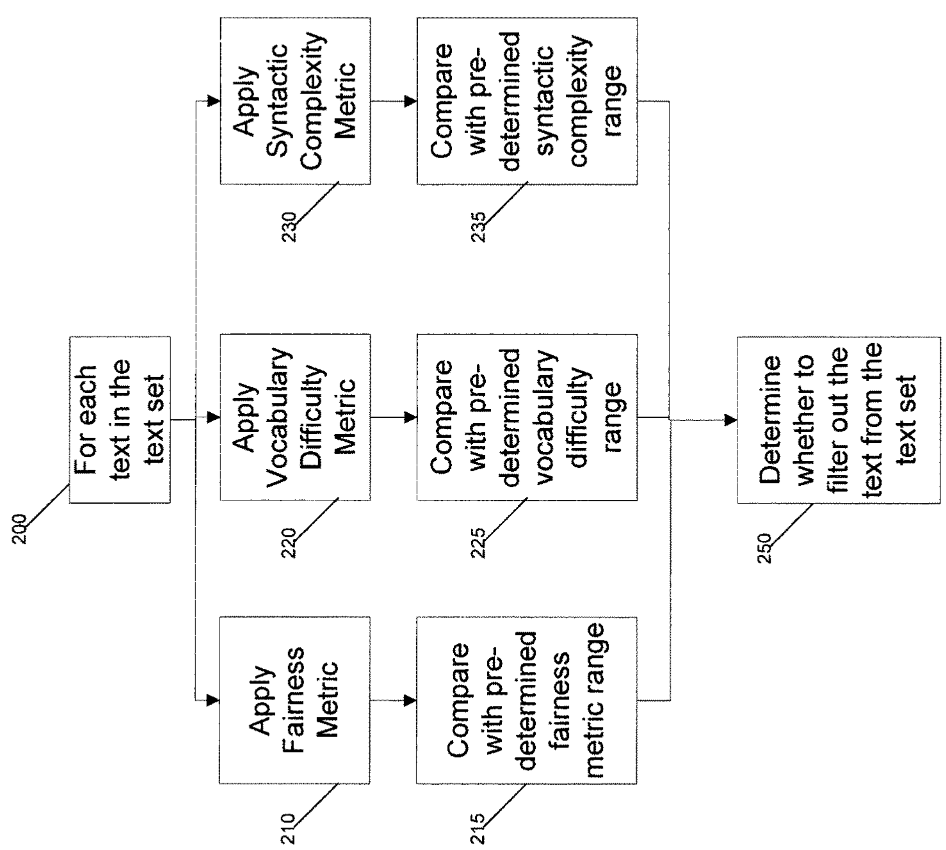
FIG. 2 is a flow diagram depicting a method of filtering texts.

FIG. 2 depicts one embodiment of the text filter module that filters texts based on one or more of the following metrics: fairness metric, vocabulary metric, syntactic complexity metric, and sentence length metric. At 200, the text filter module identifies a text in a given text set. At 210, a fairness metric is applied to the text. The fairness metric causes one or more processors to retrieve a fairness guideline, which is a list of words, phrases, and/or sentences that are prohibited due to fairness issues (e.g., specialized political words such as “alderman” or “pork barrel,” as well as other specialized words or jargons). In accordance with the fairness metric, the processor(s) then examines the text to identify any text string that appears in the fairness guideline. Based on its findings, the processor(s) generates a corresponding fairness value. At 215, the text filter module compares the generated fairness value to a pre-determined fairness metric range, which in one embodiment is determined based on a set of training texts that have been deemed suitable for the recitation task. Then at 250, the text filter module determines whether to filter out the text from the text set based on the result of the comparison and, optionally, the results of other metrics.

At 220, a vocabulary difficulty metric analyzes the text to determine a level of difficulty of its words. “Difficult words,” for example, may be foreign words or uncommon names that are inappropriate for a particular recitation task. Since difficult words tend to appear less frequently than easy words, the difficulty of a word can be estimated based on the frequency of the word appearing in a reference corpus (i.e., a word that rarely appears in the reference corpus may be deemed difficult). Based on this assumption, a vocabulary difficulty value can be estimated based on, for example, the proportion of the text’s low frequency words and average word frequency. At 225, the vocabulary difficulty value is compared to a pre-determined vocabulary difficulty range, which in one embodiment is determined based on a set of training texts that have been deemed suitable for the recitation task. Then at 250, the text filter module determines whether to filter out the text from the text set based on the result of the comparison and, optionally, the results of other metrics.

At 230, a syntactic complexity metric is employed to identify texts with overly complicated syntactic structure, which may not be appropriate for a recitation task. A syntactic complexity value may be calculated using any conventional means for estimating syntax complexity (such as those used in automated essay scoring systems). At 235, the text filter module compares the syntactic complexity value to a pre-determined syntactic complexity range, which in one embodiment is determined based on a set of training texts that have been deemed suitable for the recitation task. Then at 250, the text filter module determines whether to filter out the text from the text set based on the result of the comparison and, optionally, the results of other metrics.

One embodiment of a syntactic complexity metric 240 is employed to identify texts with overly long sentences, which may be undesirable for certain recitation tasks. The metric causes the processor(s) to determine the number of words in each sentence of the text and accordingly calculate a sentence length value (e.g., which could be the average of length of the text’s sentences or a proportion of sentences exceeding a threshold length). The text filter module compares the sentence length value to a pre-determined sentence length range, which in one embodiment is determined based on a set of training texts that have been deemed suitable for the recitation task. Then based on the result of the comparison and, optionally, the results of other metrics, the text filter module determines whether to filter out the text from the text set.

Figure 3:
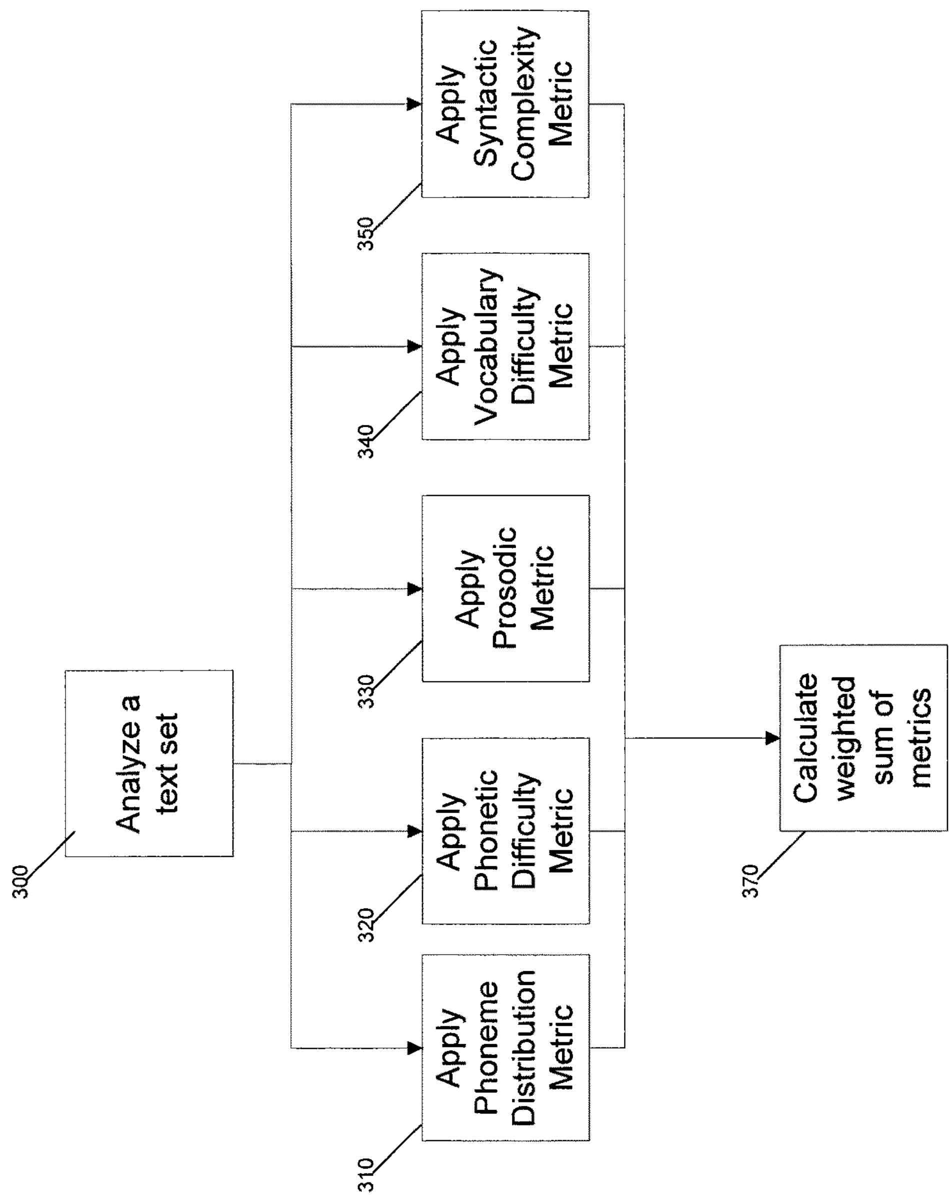
FIG. 3 is a flow diagram depicting a method of selecting texts.

FIG. 3 depicts an embodiment of a text selection module that scores text sets based on one or more of the metrics. At 300, the text selection module analyzes a text set and optionally applies it against one or more of the following non-exhaustive list of metrics: phoneme distribution metric 310 for measuring a degree of balance in the text set’s phoneme distribution; phonetic difficulty metric 320 for measuring the text set’s phonetic difficulty; prosodic metric 330 for measuring a degree of balance in the text set’s prosodic structure pattern; vocabulary difficulty metric 340 for measuring the text set’s vocabulary difficulty; syntactic complexity metric 350 for measuring the text set’s syntactic complexity (e.g., measuring the lengths of sentences appearing in the text set or its grammatical complexity). At 370, the results of one or more of the applied metrics are used to calculate a score for the text set. In one embodiment, the weight of each metric may vary according to the importance of each construct. For example, if prosody evaluation is more important than phoneme evaluation, then the prosodic metric may be afforded a relatively higher weight.

Figure 4:
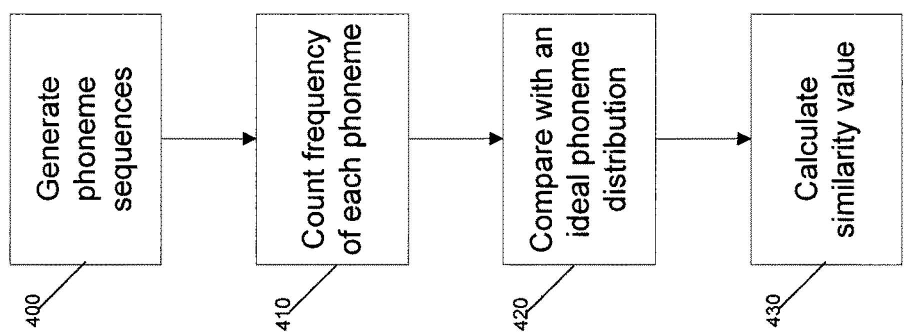
FIG. 4 is a flow diagram depicting a phoneme distribution metric.

FIG. 4 depicts one embodiment of a phoneme distribution metric. At 400, a phoneme or phoneme sequence for each word in the text set is generated. The generation may be performed manually or automatically by a processor using a pronunciation dictionary. At 410, the frequency of each phoneme or phoneme sequence is counted and used to generate a phoneme distribution for the text set. At 420, the phoneme distribution is compared with an ideal distribution. In one embodiment, the ideal distribution is determined based on a large corpus of transcripts of utterances made by native speakers of the target language (i.e., the language being assessed). In another embodiment, a uniform distribution may be ideal if it is desirable to have recitation items that evenly cover all the phonemes in English. Then at 430, a phoneme distribution similarity value is calculated using, for example, the Kuliback-Leibler (KL) measure. This phoneme distribution similarity value can then be used by the text selection module to calculate a score for the text set.

Figure 5A:
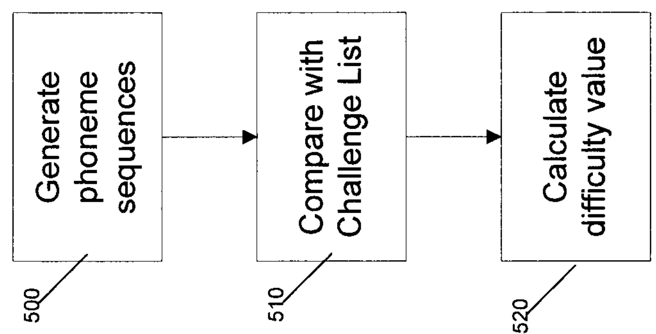
FIG. 5A is a flow diagram depicting a phonetic difficulty metric.

FIG. 5A depicts one embodiment of the phonetic difficulty metric. At 500, a phoneme or phoneme sequence for each word in the text set is generated. At 510, the generated phoneme or phoneme sequences are compared with a phonetic challenge list, which is a set of difficult phonemes or phoneme sequences pre-compiled based on expert judgment or an automatic statistical method. Then at 520, a phonetic difficulty value is calculated based on the comparison and can be used by the text selection module to calculate a score for the text set.

Figure 5C:
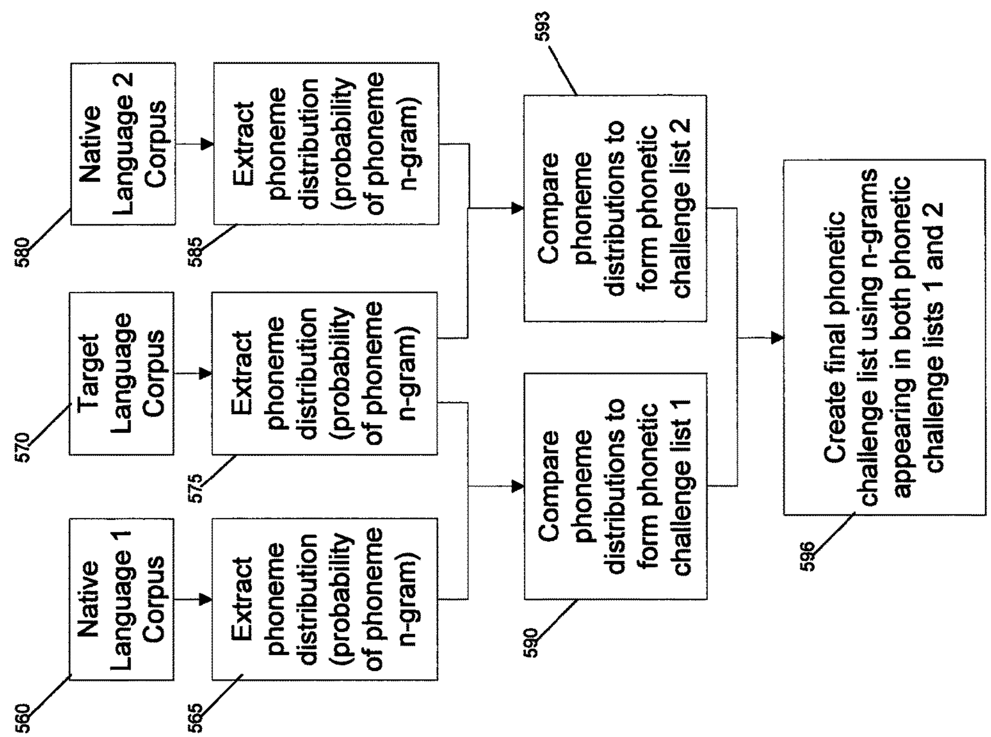
FIGS. 5B and 5C are flow diagrams depicting methods for generating phonetic challenge lists.
Figure 5B:
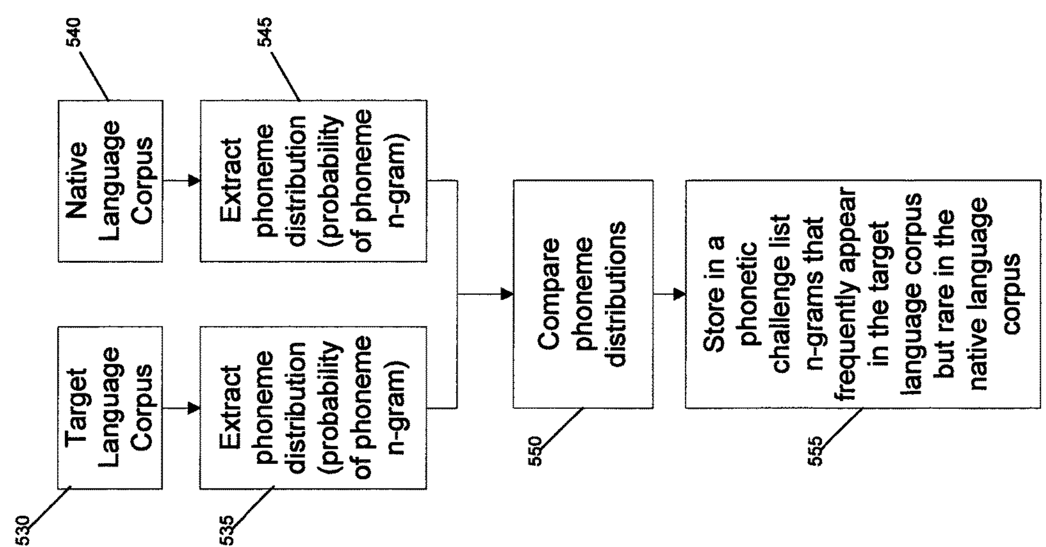

FIGS. 5B and 5C depict embodiments of the automatic statistical method for automatically generating the phonetic challenge list used by the phonetic difficulty metric. FIG. 5B relates to a method of identifying phonemes in a target language (i.e., the language which is being assessed) that may be challenging for non-native speakers of the target language to pronounce. At 530, a large corpus in the target language (e.g., English) is analyzed and at 535 the target language corpus’ phoneme distribution (e.g., probability of phoneme n-grams appearing in the corpus) is extracted. Similarity, at 540 a large corpus in the native language (e.g., Korean) of the non-native speaker is analyzed and a corresponding phoneme distribution is extracted at 545. At 550, the phoneme distribution of the target language is compared to the phoneme distribution of the native language, using measures such as the Kullback-Leibler measure. Based on the comparison, at 555 the phonemes or phoneme n-grams that frequently appear in the target language (as indicated by the target language’s phoneme distribution) but rare in the native language (as indicated by the native language’s phoneme distribution) are included in a phonetic challenge list. Such a phonetic challenge list can be used by a phonetic difficulty metric to measure a text set's phonetic difficulty level for native speakers of that particular native language (e.g., Korean).

FIG. 5C relates to a method of identifying phonemes in a target language (e.g., English) that may be challenging for a plurality of different native speakers (e.g., Korean and Japanese). At 570, a large corpus in the target language is analyzed and at 575 the target language corpus' phoneme distribution is extracted. Similarly, at 560 a large corpus in a first native language (e.g., Korean) is analyzed and a corresponding phoneme distribution is extracted at 565. Again at 580 a large corpus in a second native language (e.g., Japanese) is analyzed and a corresponding phoneme distribution is extracted at 585. The phoneme distribution of the target language is compared to the phoneme distribution of the first native language at 590 to generate a challenge list for the first native language. Similarity, the phoneme distribution of the target language is compared to the phoneme distribution of the second native language at 593 to generate a challenge list for the second native language. Then at 596, the intersection of the two challenge lists is taken to create a challenge list for both native languages. Such a phonetic challenge list can be used by a phonetic difficulty metric to measure a text set's phonetic difficulty level for native speakers of the first native language and native speakers of the second native language. While FIG. 5C depicts two native languages being used to create the challenge list, the method of creating the challenge list can be scaled to accommodate any number of native languages.

Figure 6:
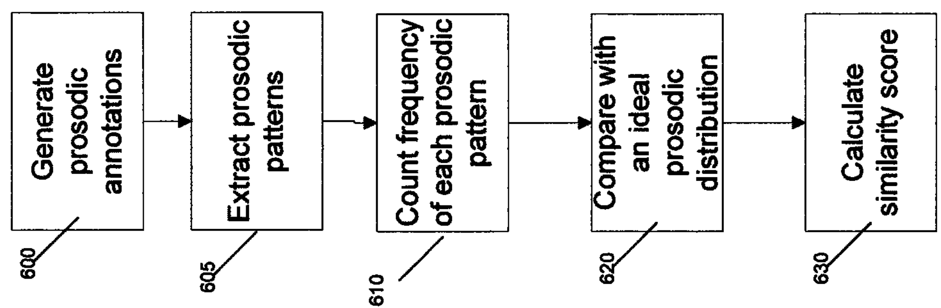
FIG. 6 is a flow diagram depicting a prosodic distribution metric.

FIG. 6 depicts one embodiment of the prosodic metric. At 600, the prosodic annotation of a text set is generated. The annotation may be performed manually or by any automation method, including but not limited to speech synthesis algorithms, AuToBI, and machine learning algorithms trained on human annotation. At 605, prosodic patterns are extracted from the prosodic annotations. In one embodiment, the prosodic patterns are identified by syntactic structures, such as sentence type or a syntactic parse tree. At 610, the frequency of each prosodic pattern is counted and used to generate a prosodic distribution for the text set. In another embodiment, the frequency of pre-determined syntactic structures represented by specific prosodic patterns is counted. At 620, the prosodic distribution is compared with an ideal prosodic distribution. In one embodiment, the ideal prosodic distribution is determined based on a large corpus of transcripts of utterances made by native speakers of the target language (i.e., the language being assessed). In another embodiment, a uniform distribution may be ideal. Then at 630, a prosodic similarity value is calculated using, for example, the Kullback-Leibler (KL) measure. This prosodic similarity value can then be used by the text selection module to calculate a score for the text set.

Figure 7A:
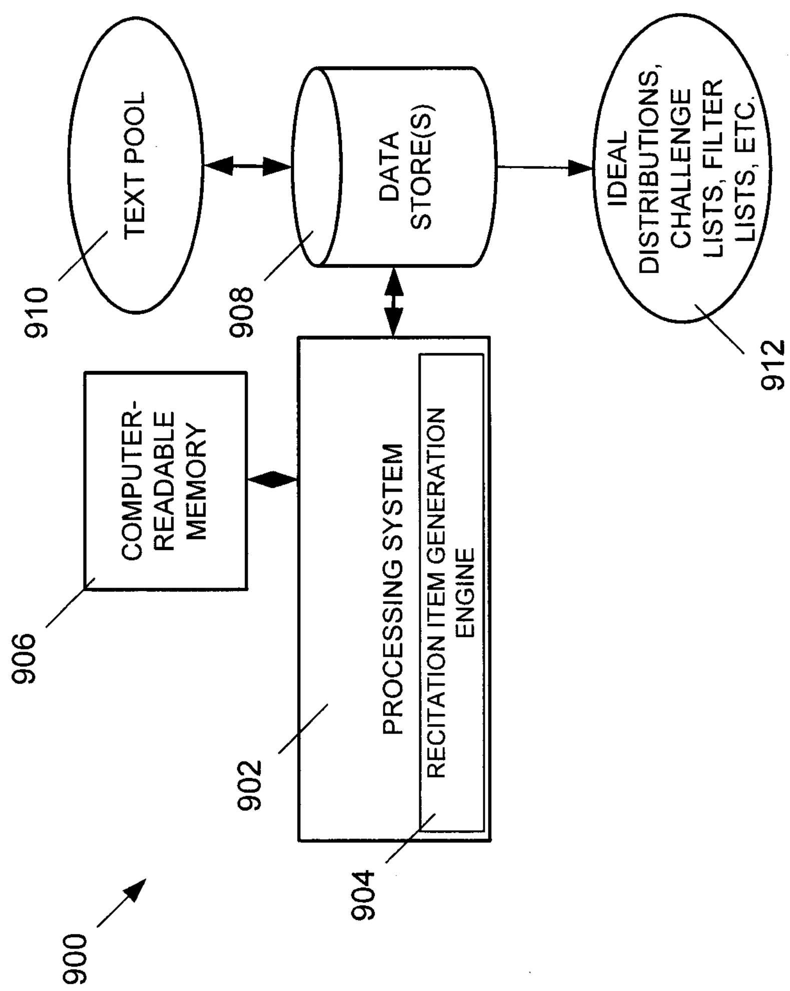
FIGS. 7A, 7B, and 7C depict example systems for implementing a recitation item generation engine.
Figure 7B:
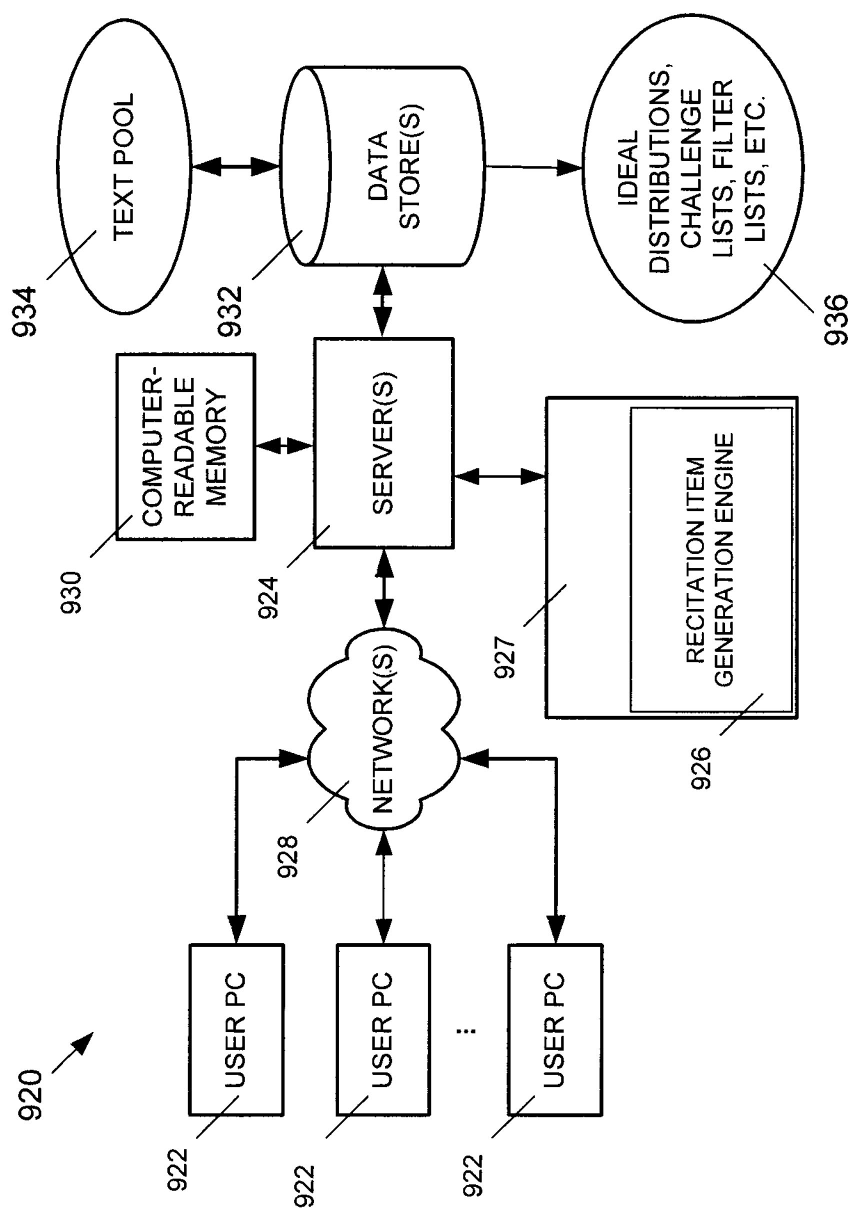
Figure 7C:
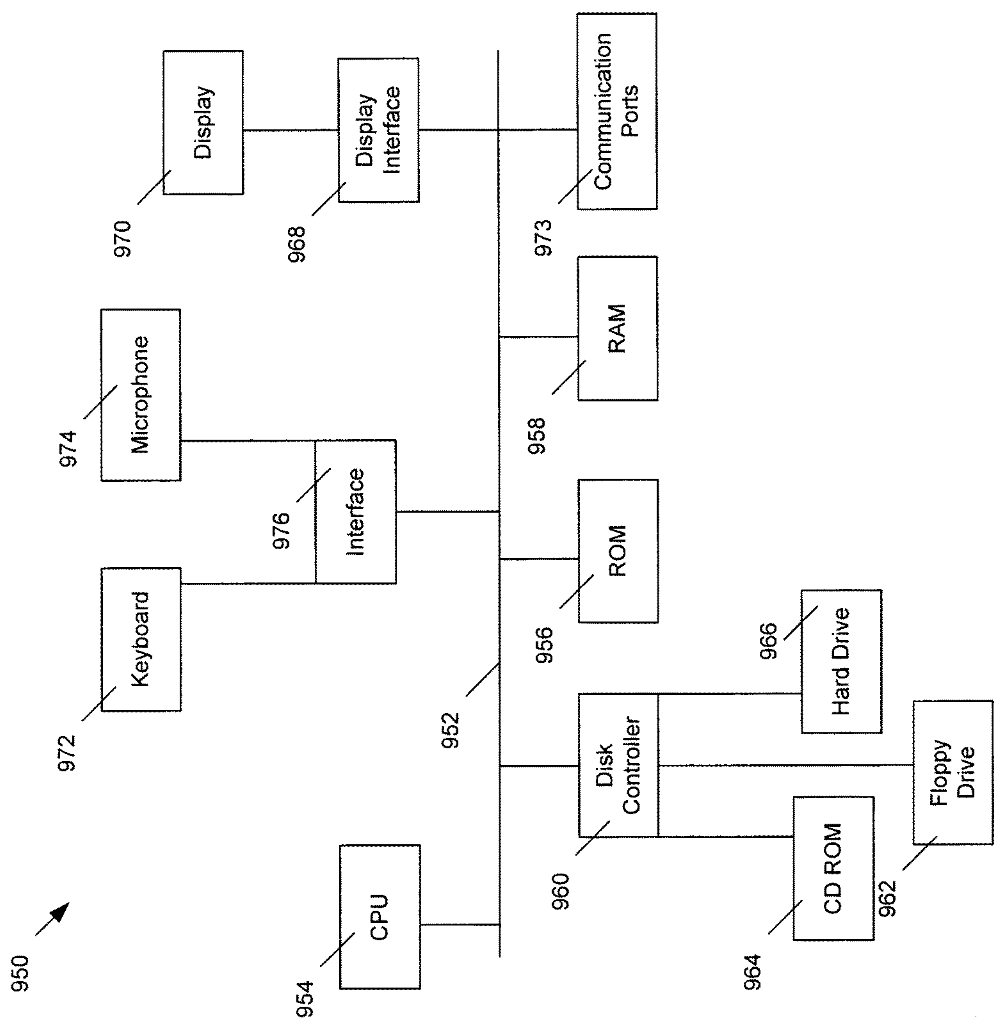

FIGS. 7A, 7B, and 7C depict example systems for use in implementing an automated recitation item generation engine. For example, FIG. 7A depicts an exemplary system 900 that includes a stand-alone computer architecture where a processing system 902 (e.g., one or more computer processors) includes an automated recitation item generation engine 904 (which may be implemented as software). The processing system 902 has access to a computer-readable memory 906 in addition to one or more data stores 908. The one or more data stores 908 may contain a text pool 910 as well as any data 912 used by the modules or metrics, such as ideal distributions, challenge lists, filter lists, etc.

FIG. 7B depicts a system 920 that includes a client server architecture. One or more user PCs 922 accesses one or more servers 924 running an automated recitation item generation engine 926 on a processing system 927 via one or more networks 928. The one or more servers 924 may access a computer readable memory 930 as well as one or more data stores 932. The one or more data stores 932 may contain a text pool 934 as well as any data 936 used by the modules or metrics.

FIG. 7C shows a block diagram of exemplary hardware for a standalone computer architecture 950, such as the architecture depicted in FIG. 7A, that may be used to contain and/or implement the program instructions of exemplary embodiments. A bus 952 may serve as the information highway interconnecting the other illustrated components of the hardware. A processing system 954 labeled CPU (central processing unit) (e.g., one or more computer processors), may perform calculations and logic operations required to execute a program. A computer-readable storage medium, such as read only memory (ROM) 956 and random access memory (RAM) 958, may be in communication with the processing unit 954 and may contain one or more programming instructions for performing the method of implementing a content scoring engine. Optionally, program instructions may be stored on a non-transitory computer readable storage medium such as a magnetic disk, optical disk, recordable memory device, flash memory, RAM, ROM, or other physical storage medium. Computer instructions may also be communicated via a communications signal, or a modulated carrier wave and then stored on a non-transitory computer-readable storage medium.

A disk controller 960 interfaces one or more optional disk drives to the system bus 952. These disk drives may be external or internal floppy disk drives such as 962, external or internal CD-ROM, CD-R, CD-RW or DVD drives such as 964, or external or internal hard drives 966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 960, the ROM 956 and/or the RAM 958. Preferably, the processor 954 may access each component as required.

A display interface 968 may permit information from the bus 952 to be displayed on a display 970 in audio, graphic, or alphanumeric format. Communication with external devices may optionally occur using various communication ports 973.

In addition to the standard computer-type components, the hardware may also include data input devices, such as a keyboard 972, or other input device 974, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

It is claimed:

1. A computer-implemented method of generating recitation items for assessing speaking proficiency, the method comprising:

generating, using one or more processing systems, one or more text sets, wherein each text set is in a target language and includes one or more texts;

extracting a target language phoneme distribution from a target language corpus that is in the target language;

extracting a first native language phoneme distribution from a first native language corpus that is in a first native language of one or more users;

extracting a second native language phoneme distribution from a second native language corpus that is in a second native language of one or more users;

comparing the target language phoneme distribution to the first native language phoneme distribution to identify any first phoneme n-gram (i) whose frequency of appearing in the target language corpus satisfies a first predetermined criterion and (ii) whose frequency of appearing in the first native language corpus satisfies a second predetermined criterion, wherein any such identified first phoneme n-gram is included in a first list; and comparing the target language phoneme distribution to the second native language phoneme distribution to identify any second phoneme n-gram (i) whose frequency of appearing in the target language corpus satisfies a third predetermined criterion and (ii) whose frequency of appearing in the second native language corpus satisfies a fourth predetermined criterion, wherein any such identified second phoneme n-gram is included in a second list;

determining, using the one or more processing systems, a value for each text set using one or more metrics that include a phonetic difficulty metric by:

generating phoneme sequences for each text set;

comparing the phoneme sequences with a phonetic challenge list that includes any phoneme n-gram appearing in both the first list and the second list;

computing, based on the comparison, a respective phonetic difficulty value for each text set, and determining the value for each text set based on at least the respective phonetic difficulty value; and selecting, using the one or more processing systems, a final text set from the one or more text sets to serve as the recitation items for assessing speaking proficiency based on the values associated with the text sets.

2. The method of claim 1, further comprising:

filtering at least one text in a text pool to obtain at least one filtered text;

wherein generating the one or more text sets includes selecting at least one filtered text.

3. The method of claim 2, wherein the step of filtering includes:

identifying any word or phrase that appears in both a pre-determined fairness list and the at least one text in the text pool;

determining a fairness metric value associated with the at least one text;

determining whether to include the at least one text in one or more of the text sets based on at least the fairness metric value.

4. The method of claim 2, wherein the step of filtering includes:

determining a vocabulary difficulty filtering value associated with the at least one text in the text pool by applying one or more filter vocabulary difficulty metrics that measure the difficulty of the words in the at least one text;

determining whether to include the at least one text in one or more of the text sets based on at least the vocabulary difficulty filtering value.

5. The method of claim 4, wherein one of the one or more filter vocabulary difficulty metrics includes determining a proportion of low frequency words appearing in the at least one text, wherein a low frequency word is a word whose frequency of appearing in a reference corpus is below a pre-determined threshold.

6. The method of claim 2, wherein the step of filtering includes:

determining a syntactic complexity filtering value associated with the at least one text in the text pool by applying one or more filter syntactic complexity metrics that measure the complexity of the sentences in the at least one text;

determining whether to include the at least one text in one or more of the text sets based on at least the syntactic complexity filtering value.

7. The method of claim 1, further comprising:

filtering the one or more text sets to obtain one or more filtered text sets;

wherein determining a value for each text set includes determining a value for each of the one or more filtered text sets.

8. The method of claim 7, wherein the step of filtering the one or more text sets includes, for each respective text set:

identifying any word or phrase that appears in both a pre-determined fairness list and the respective text set;

determining a fairness metric value associated with the respective text set;

determining whether to include the respective text set in the one or more filtered text sets based on at least the fairness metric value.

9. The method of claim 7, wherein the step of filtering the one or more text sets includes, for each respective text set:

determining a vocabulary difficulty filtering value associated with the respective text set by applying one or more filter vocabulary difficulty metrics;

determining whether to include the respective text set in the one or more filtered text sets based on at least the vocabulary difficulty filtering value.

10. The method of claim 9, wherein the one of the one or more filter vocabulary difficulty metrics includes determining a proportion of low frequency words appearing in the respective text set, wherein a low frequency word is a word whose frequency of appearing in a reference corpus is below a pre-determined threshold.

11. The method of claim 7, wherein the step of filtering the one or more text sets includes, for each respective text set:

determining a syntactic complexity filtering value associated with the respective text set by applying one or more filter syntactic complexity metrics;

determining whether to include the respective text set in the one or more filtered text sets based on at least the syntactic complexity filtering value.

12. The method of claim 1, wherein the one or more metrics include a vocabulary difficulty metric by determining a respective vocabulary difficulty value associated with each text set;

wherein determining the value for each text set is based on at least the respective vocabulary difficulty value associated with each text set.

13. The method of claim 12, wherein determining the respective vocabulary difficulty value includes determining a proportion of low frequency words appearing in each text set, wherein a low frequency word is a word whose frequency of appearing in a reference corpus is below a pre-determined threshold.

14. The method of claim 1, wherein the one or more metrics include a syntactic complexity metric by determining a respective syntactic complexity value associated with each text set;

wherein determining the value for each text set is based on at least the respective syntactic complexity value associated with each text set.

15. The method of claim 1, wherein the one or more metrics include a phoneme distribution metric by:

generating phoneme sequences for each text set;

determining a phoneme distribution of the phoneme sequences; and comparing the phoneme distribution with an ideal phoneme distribution and computing a respective phoneme distribution similarity value for each text set;

wherein determining the value for each text set is based on at least the respective phoneme distribution similarity value.

16. The method of claim 15, wherein the ideal phoneme distribution is determined based on a reference data set that includes utterances in the target language spoken by native speakers of the target language.

17. The method of claim 1, wherein the phonetic challenge list is generated automatically by:

extracting a target language phoneme distribution from a target language corpus, wherein the target language corpus is in the language of the one or more text sets;

extracting a native language phoneme distribution from a native language corpus, wherein the native language corpus is in a native language of a user; and comparing the target language phoneme distribution to the native language phoneme distribution to identify any phoneme n-gram whose frequency of appearing in the target language corpus satisfies a first predetermined criterion and whose frequency of appearing in the native language corpus satisfies a second predetermined criterion, wherein the challenge list includes any such identified phoneme n-gram.

18. The method of claim 1, wherein the one or more metrics include a prosody distribution metric by:

generating prosodic annotations for each sentence in each text set;

extracting prosodic patterns from the prosodic annotations;

determining a prosodic distribution from the prosodic patterns; and comparing the prosodic distribution with an ideal prosodic distribution and computing a respective prosodic distribution similarity value;

wherein determining the value for each text set is based on at least the respective prosodic distribution similarity value.

19. The method of claim 18, wherein the prosodic patterns are identified by syntactic structures and the prosodic annotations are automatically generated using an automated prosody annotation system or are generated using tones and break indices (ToBI).

20. The method of claim 18, wherein the ideal prosodic distribution is determined based on a reference data set that includes utterances in the target language spoken by native speakers of the target language.

21. The method of claim 1, wherein determining the value for each text set includes applying one or more weights to the one or more selected metrics.

* * * * *